(12) United States Patent
Ax et al.

(10) Patent No.: US 11,034,521 B2
(45) Date of Patent: Jun. 15, 2021

(54) TRANSPORTING APPARATUS HAVING A RAILING WITH REINFORCING SEGMENTS

(71) Applicant: HEUFT SYSTEMTECHNIK GMBH, Burgbrohl (DE)

(72) Inventors: Harald Ax, Oberzissen (DE); Bernhard Heuft, Burgbrohl (DE)

(73) Assignee: Heuft Systemtechnik GmbH, Burgbrohl (DE)

( * ) Notice: Subject to any disclaimer, the term of this patent is extended or adjusted under 35 U.S.C. 154(b) by 0 days.

(21) Appl. No.: 16/644,259

(22) PCT Filed: Sep. 6, 2018

(86) PCT No.: PCT/EP2018/074068
§ 371 (c)(1),
(2) Date: Mar. 4, 2020

(87) PCT Pub. No.: WO2019/048578
PCT Pub. Date: Mar. 14, 2019

(65) Prior Publication Data
US 2020/0198897 A1    Jun. 25, 2020

(30) Foreign Application Priority Data

Sep. 7, 2017 (DE) .................... 10 2017 008 387.8

(51) Int. Cl.
*B65G 21/20* (2006.01)
*B65G 47/76* (2006.01)
*B65G 15/12* (2006.01)

(52) U.S. Cl.
CPC ....... *B65G 21/2072* (2013.01); *B65G 47/766* (2013.01); *B65G 15/12* (2013.01)

(58) Field of Classification Search
CPC ... B65G 21/2072; B65G 47/766; B65G 15/12
(Continued)

(56) References Cited

U.S. PATENT DOCUMENTS 4,470,499 A * 9/1984 Sijbrandij .......... B65G 21/2072
198/836.3
5,322,160 A   6/1994 Markiewicz et al.
(Continued)

FOREIGN PATENT DOCUMENTS

DE    24 39 804 A1    3/1976
DE    296 10 201 U1   1/1997
(Continued)

OTHER PUBLICATIONS

International Preliminary Report on Patentability issued in related application PCT/EP2018/074068, with English language translation, dated Mar. 10, 2020, 16 pages.
(Continued)

*Primary Examiner* — Gene O Crawford
*Assistant Examiner* — Lester Ill Rushin
(74) *Attorney, Agent, or Firm* — Faegre Drinker Biddle & Reath LLP (57) ABSTRACT

An apparatus for transporting objects, preferably containers, which has a transporting device. The transporting device is designed to transport objects. The apparatus also has a railing which is designed to guide the objects transported on the transporting device. The railing has a guide element which is designed to guide the objects. In addition, the railing has a plurality of reinforcing segments which are arranged adjacent to the guide element and are designed to reinforce the guide element.

12 Claims, 5 Drawing Sheets

(58) Field of Classification Search
USPC .......................................................... 198/599
See application file for complete search history.

(56) References Cited

U.S. PATENT DOCUMENTS

| | | | | |
|---|---|---|---|---|
| 5,551,555 | A | * | 9/1996 | Gladieux ........... B65G 21/2072 198/633 |
| 5,782,339 | A | * | 7/1998 | Drewitz ............. B65G 21/2072 198/836.3 |
| 5,896,980 | A | | 4/1999 | Butler |
| 5,927,480 | A | * | 7/1999 | McCaffrey ......... B65G 21/2072 198/836.3 |
| 6,053,654 | A | * | 4/2000 | Ledingham ........ B65G 21/2072 198/836.1 |
| 8,714,338 | B2 | | 5/2014 | Matheisl et al. |
| 8,995,668 | B2 | * | 3/2015 | McCarthy ............. H04W 12/02 380/277 |
| 9,828,186 | B2 | * | 11/2017 | Weickert ............ B65G 21/2072 |
| 10,836,853 | B2 | * | 11/2020 | Cheng ................... C08F 210/18 |

FOREIGN PATENT DOCUMENTS

| | | |
|---|---|---|
| DE | 698 04 547 T2 | 11/2002 |
| DE | 10 2010 000 596 A1 | 9/2011 |
| DE | 10 2015 006 979 A1 | 12/2016 |
| RU | 2 500 606 C2 | 12/2013 |

OTHER PUBLICATIONS

Office Action and Search Report issued in related application RU 2020112379, with partial machine generated English language translation, dated Jun. 25, 2020, 11 pages.

Office Action issued in related application CA 3,069,552, dated Jan. 27, 2021, 7 pages.

* cited by examiner

TRANSPORTING APPARATUS HAVING A RAILING WITH REINFORCING SEGMENTS

CROSS-REFERENCE TO RELATED APPLICATIONS

This application is the U.S. national phase of the International Patent Application No. PCT/EP2018/074068 filed Sep. 6, 2018, which claims the benefit of German Patent Application No. 10 2017 008 387.8 filed Sep. 7, 2017, the entire content of which is incorporated herein by reference.

FIELD

The disclosure relates to an apparatus for transporting objects, preferably containers. The apparatus has a transporting device which is designed to transport objects. The apparatus furthermore has a railing which is designed to guide the objects transported on the transporting device. Finally, the apparatus has a railing with a guide element for guiding the objects.

BACKGROUND

In conventional transporting apparatuses with a railing, it is known to use an elastic guide element for the railing, and to provide the guide element with a reinforcing plate. The reinforcing plate is connected to the guide element, with the result that the stability of the railing is guaranteed. The reinforcing plate is pre-shaped for this purpose and connected to the guide element during the final assembly of the transporting apparatus. This procedure leads to the railing being able to be adapted only with difficulty if it turns out during the final assembly that the shape of the railing has to be modified. In this case, either the reinforcing plate has to be re-shaped or a new reinforcing plate has to be produced.

The object of the present disclosure is therefore to provide a transporting apparatus with a railing, wherein the shape of the railing can be adapted more easily.

SUMMARY

For this, an apparatus for transporting objects, preferably containers, which has a transporting device is proposed. The transporting device is designed to transport objects. The apparatus furthermore has a railing which is designed to guide the objects transported on the transporting device. The railing has an elastic guide element which is designed to guide the objects and extends over the entire length of the transporting device. In addition, the railing has a plurality of reinforcing segments spaced apart from each other, which are arranged adjacent to the guide element and are designed to reinforce the elastic guide element.

The guide element is designed elastic, with the result that the shape of the railing can be freely selected during the final assembly, before the guide element is then reinforced by the reinforcing segments. The guide element is preferably designed as a plastic element, particularly preferably as an extruded elongated plastic element.

The use of a plurality of reinforcing segments to reinforce the guide element of the railing makes it possible to adapt the shape of the railing easily. During the final assembly of a transporting apparatus the precise railing shape does not have to be determined in advance and a corresponding reinforcing plate does not have to be produced. Instead, the specific railing shape can be determined in situ and the guide element can be shaped correspondingly. The guide element is then reinforced by the reinforcing segments and its final shape is defined.

The shape of the railing can also be modified, if it is ascertained that the railing has to be changed in order to guarantee optimal guiding of objects. Through the use of the plurality of reinforcing segments, in this case one or more of the reinforcing segments can be removed or replaced and the guide element can then be reshaped. The guide element can then be reinforced again by reinforcing segments and the overall shape of the railing can hereby be modified. It is also conceivable for the reinforcing segments to allow a subsequent movement of the railing, with the result that the shape of the railing can be modified without the reinforcing segments being damaged in the process. In the case of the use of a single reinforcing profile, this would be hardly possible. The railing can also be adapted to different objects by the reinforcing segments. For example, bottles with different weights can be transported by the transporting device. Bottles with a higher weight can be guided by a railing with higher rigidity and higher inertia, while a railing with lower rigidity and lower inertia can be advantageous for bottles with a lower weight. The rigidity and inertia of the railing can be set by the reinforcing segments.

The term "transporting device", as used herein, comprises any type of transporters typically used in the transport of the above-specified objects. Bottles or cans are preferably transported on endless chain link conveyors or conveyor belts, which are motor-driven via deflection rollers and can be designed both straight and curved. However, the present disclosure is not limited to the use of chain link conveyors or conveyor belts.

The guide element can have a C-profile in cross section. The reinforcing segments can be inserted into the guide element. In this case the guide element encloses the reinforcing segments.

The guide element is preferably designed to come into contact with and to guide the objects on the transporting device, with the result that they can be conveyed on the transporting device as desired. Objects within the meaning of the present disclosure can be containers such as glass bottles, plastic bottles, containers, cans, cases or other packages. In the case where the guide element has a C-profile, the reinforcing segments preferably have a rectangular cross-section profile. The reinforcing segments can thus easily be inserted or pushed into the C-profile, seen in cross section, of the guide element.

Alternatively, the reinforcing segments can also have a C-profile in cross section. In this case, the guide element is preferably provided with grooves, with the result that the reinforcing segments can engage in the grooves of the guide element. In this embodiment the guide element can be pushed into the reinforcing segments.

The guide element and the reinforcing segments can generally have any shaping, as long as the guide element is suitably designed to guide objects on the transporting device and the reinforcing segments are designed to reinforce the guide element.

The guide element and the reinforcing segments can have complementary profiles, with the result that the guide element can be connected to the reinforcing segments in a positive-locking manner. Additionally or alternatively, the guide element can also be connected to the reinforcing segments in a material-bonding manner.

The reinforcing segments preferably consist of metal. Conceivable metals are for example aluminum or steel, preferably stainless steel. The reinforcing segments can also consist of stone material or ceramic. The stability of the railing can be hereby guaranteed, with the result that the latter essentially cannot be deformed by objects which are pressed against the railing by the transporting device.

The transporting apparatus preferably has a railing with a single guide element. If several railings are provided or several guide elements are provided, a plurality of reinforcing segments, preferably at least three reinforcing segments, particularly preferably five or seven reinforcing segments, are assigned to each guide element.

Should an elastic guide element be provided without the reinforcing segments according to the disclosure, the elasticity of the guide element could lead to objects, which are pressed against the guide element by the transporting device, being pushed back elastically by the guide element, with the result that the objects could spring back and could possibly fall over. Through the use of the reinforcing segments and in particular in the case of the use of metal reinforcing segments, the inertia of the guide element is increased, with the result that an impact between an object and the railing is attenuated. Objects can hereby be prevented from falling over.

In addition, the use of the reinforcing segments in combination with the guide element ensures that the railing can withstand the pressure of a plurality of objects which are pressed against the railing by the transporting device.

The transporting apparatus preferably has at least one railing holder, to which the elastic guide element can be fastened. The railing holder is preferably connected to the elastic guide element in such a way that the reinforcing segments arranged between the railing holders are thereby at the same time also held in their position with respect to the guide element.

In this way, the railing holder can prevent the reinforcing segments from slipping sideways with respect to the guide element, and thus provide the dimensional stability of the railing.

The railing holder can preferably be formed to define the spatial course of the railing. For this purpose, the railing holder can be connected to the elastic guide element in order to achieve a local fixing of the guide element at this location. A plurality of railing holders is preferably provided, to which the elastic guide element can be fastened. It can hereby be made possible to fix the guide element at a plurality of locations. Independently of whether the railing follows a curved course or has a relatively straight course, more or fewer railing holders can be provided. The elastic guide element can in each case also be connected to one railing holder via one of the reinforcing elements. The railing holders can be firmly connected to the transporting device.

The reinforcing segments preferably have a length of from 10 to 500 mm, the reinforcing segments preferably have a length of 50 mm, 100 mm or 200 mm. Reinforcing segments of different lengths can thus be used for different applications. If the railing has a curved course with a small curve radius, reinforcing segments with a short length, for example of 50 mm, are used in order to reinforce the guide element of the railing. On the other hand, if the railing has a relatively straight course, longer reinforcing segments, for example of 200 mm in length, can be used to reinforce the guide element of the railing. Thus, depending on the specific field of application, the railing guide can be set easily at the location of the final assembly, without a pre-shaped reinforcing profile having to be used for this purpose.

The reinforcing segments preferably have a straight course. In addition, the reinforcing segments can be pre-shaped and have a curvilinear or curved course. In this way, different railing shapes can be realized through the use of appropriate reinforcing segments. For example, a plurality of straight reinforcing segments, reinforcing segments with a slight curvature and reinforcing segments with a strong curvature can be provided and a corresponding shaping of the railing can be realized during a final assembly of the railing through the use of appropriate reinforcing segments.

The reinforcing segments can preferably be connectable to each other. The reinforcing segments are hereby prevented from being shifted or slipping with respect to the guide element of the railing.

Particularly preferably, the reinforcing segments can be rigidly connected to each other. It can hereby be guaranteed that the course of the guide element of the railing can be modified easily. At the same time, after the course of the railing has been established, the reinforcing segments can be rigidly connected and a high dimensional stability of the railing can hereby be achieved. The connection of the reinforcing segments to each other can be carried out in any manner familiar to a person skilled in the art.

The disclosure further relates to a method for producing an apparatus for transporting objects, preferably containers, wherein the method comprises the following method steps:

providing a transporting device which is designed to transport objects, and providing a railing which is designed to guide the objects transported on the transporting device, wherein the railing has an elastic guide element which is designed to guide the objects and extends over the entire length of the transporting device, and wherein the railing has a plurality of reinforcing segments spaced apart from each other, which are arranged adjacent to the elastic guide element and are designed to reinforce the elastic guide element.

A major advantage of the method according to the disclosure is that the precise course of the railing need not be established until the transporting apparatus is being assembled. For this purpose, the elastic guide element is first fastened to one or more railing holders. The precise position of the railing holders often does not result until during the assembly, with the result that in the case of conventional railing systems the precision manufacturing of the railing parts could not be begun until this point in time. In the method according to the disclosure, on the other hand, the elastic guide element can be adapted to any desired railing course.

Preferably, the elastic guide element is then reinforced by means of a plurality of reinforcing elements in the areas between the railing holders.

The reinforcing segments are preferably designed connectable to each other, with the result that the reinforcing segments, after the elastic guide element has been reinforced with them, can be rigidly connected to each other. In this way, a guide railing can be obtained, which is just as stable as conventional guide rails, but at the same time can be used much more flexibly when the transporting device is set up.

BRIEF DESCRIPTION OF THE DRAWINGS

Various embodiments are illustrated in the drawings, in which.

DETAILED DESCRIPTION

Figure 1:
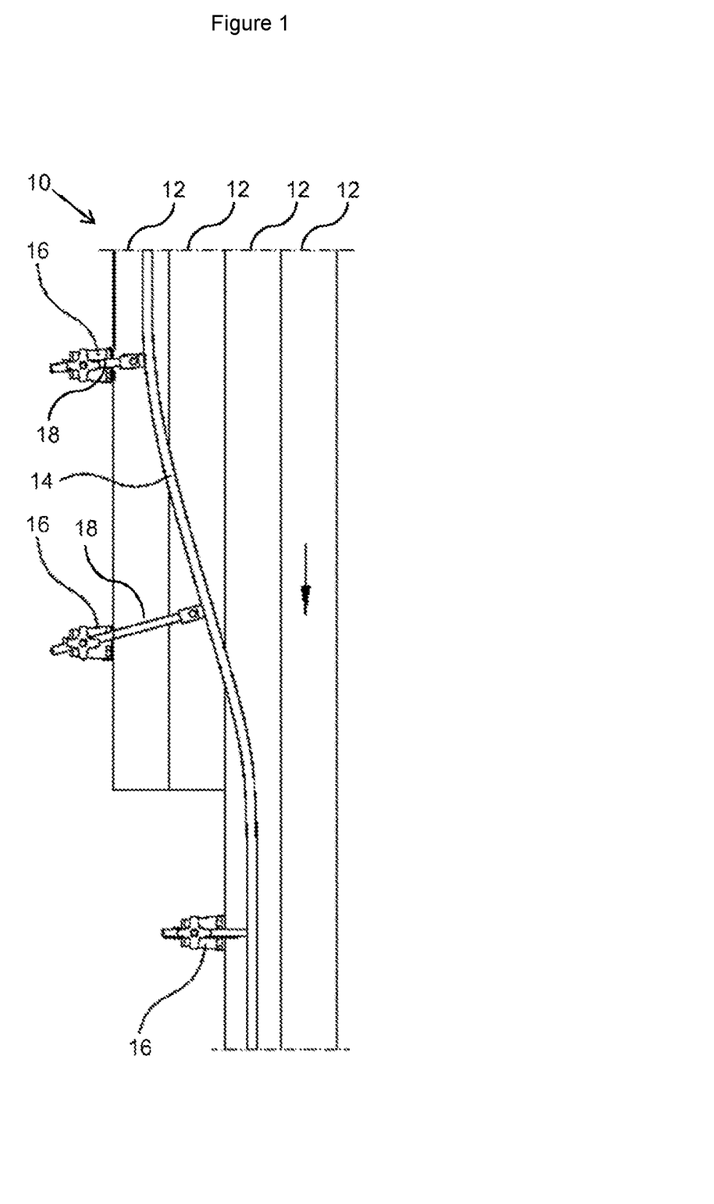
FIG. 1 is an illustrative representation of the transporting apparatus according to an embodiment with a curved course.

FIG. 1 shows an apparatus for transporting objects. The apparatus has a transporting device 10. The transporting device 10 is designed to transport objects. For this purpose, the transporting device 10 has a plurality of conveyor belts 12. Objects, such as for example glass bottles, are transported on the conveyor belts 12 in the direction of the arrow shown in FIG. 1.

In the case shown in FIG. 1, four conveyor belts 12 are shown, wherein objects transported on these conveyor belts 12 are to be guided onto a narrower course of the conveyor belts 12. The number of conveyor belts 12 is to be reduced from four to two. For this purpose, the apparatus has a railing 14. The railing 14 is arranged above the transport plane of the conveyor belts 12 and guides objects which are transported on the conveyor belts 12 along a path which leads to a narrowing of the stream of containers. For this purpose, the railing 14 has a curved shape.

In order to realize the curved shaping of the railing 14, railing holders 16 are provided, which are connected to the railing 14 by means of connecting axes 18.

Figure 2:
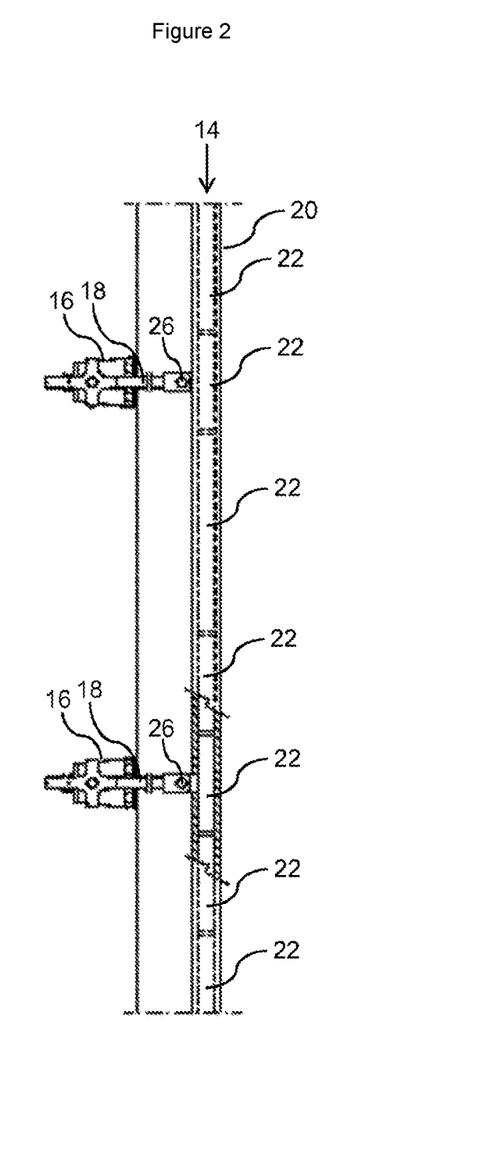
FIG. 2 is an illustrative representation of the transporting apparatus according to an embodiment with a straight course and reinforcing segments.

FIG. 2 shows the transporting apparatus according to the disclosure with a straight course. In order to provide a railing 14 that is easy to install and to modify, the railing 14 has a guide element 20. A plurality of reinforcing segments 22 are provided for reinforcing the guide element 20. The plurality of reinforcing segments 22 are assigned to a single long guide element 20 and ensure a reinforcing of the guide element 20. In the event of the accumulation of many objects, the railing 14 is protected from an undesired deformation by the reinforcement. Moreover, the reinforcing segments 22 ensure that objects which are pressed against the railing 14 do not fall over. For this purpose, the reinforcing segments 22 increase the inertia of the railing 14 through their own weight.

Figure 3:
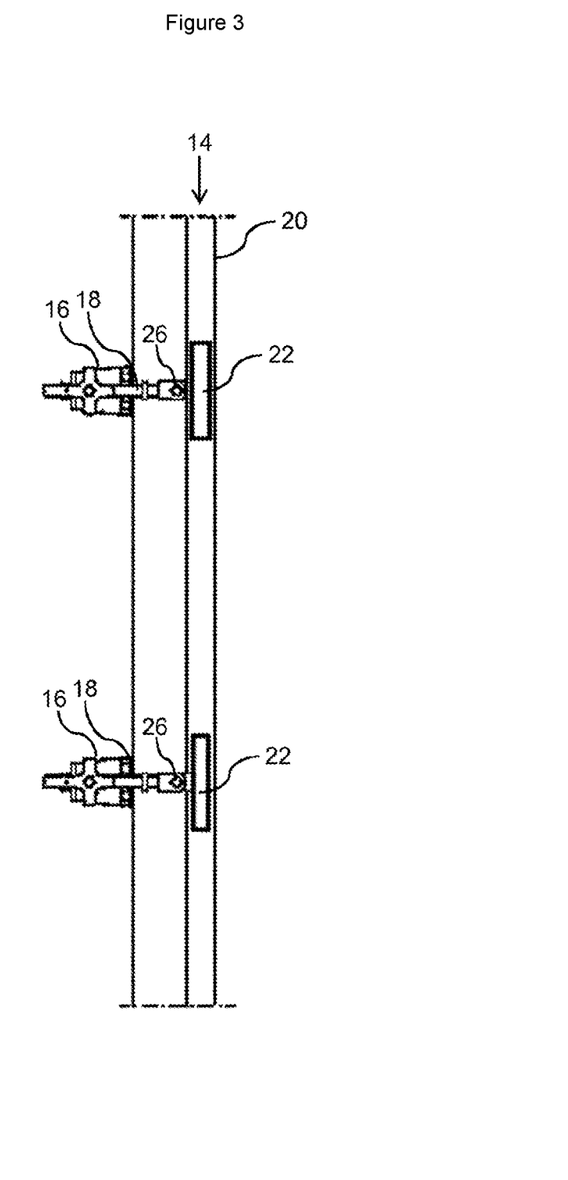
FIG. 3 is an illustrative representation of the transporting apparatus according to an embodiment with a straight course and a reduced number of reinforcing segments.

In the case shown in FIG. 2, the reinforcing segments 22 are arranged directly adjacent to each other in the guide element 20. The reinforcing segments 22 thus fill the guide element 20. Alternatively, only isolated reinforcing segments 22 can also be provided in the guide element 20. This case is represented in FIG. 3. The number of reinforcing segments 22 can be selected dependent on the desired characteristic of the railing 14, in particular the desired rigidity and inertia of the railing 14.

Figure 4:
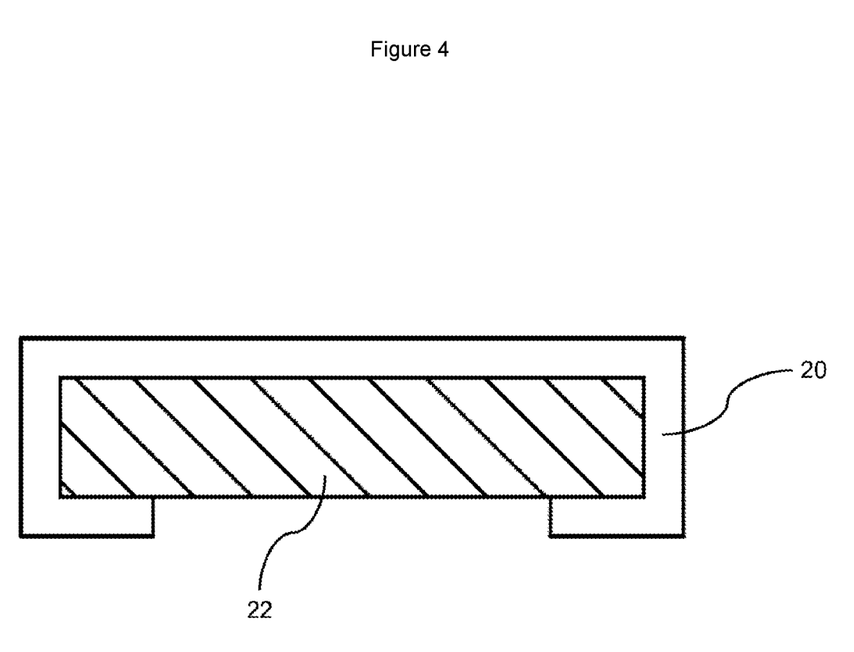
FIG. 4 is a cross-section profile of a railing according to the disclosure with a guide element and a reinforcing segment.
Figure 5:
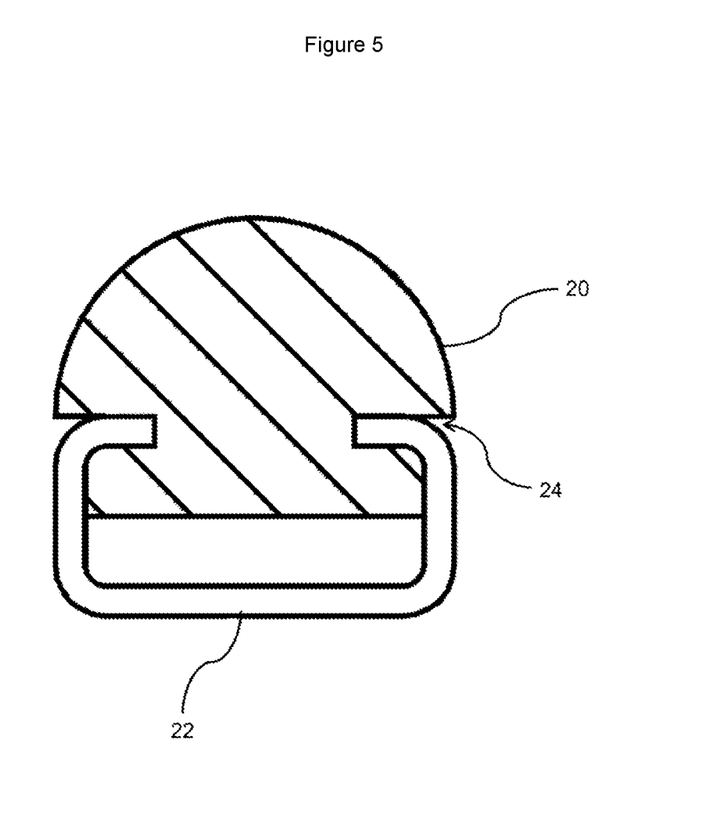
FIG. 5 is an embodiment of the guide element and the reinforcing segments of the railing with a different cross section.

The guide element 20 as well as the reinforcing segments 22 can have different cross-section profiles. Two example cross-section profiles are shown in FIGS. 4 and 5. FIG. 4 shows an embodiment in which the guide element 20 has a C-profile in cross section. The reinforcing segments 22 have a rectangular cross-section profile and are enclosed by the guide element 20. During the installation of the railing the reinforcing segments 22 can be pushed into the guide element 20.

FIG. 5 shows an embodiment in which the reinforcing segments 22 have a C-profile in cross section. The guide element 20 has grooves 24 into which the reinforcing segments can be inserted. In the embodiments shown in FIGS. 4 and 5, a positive locking is thus achieved between the guide element 20 and the reinforcing segments 22.

In order to prevent the reinforcing segments 22 from slipping with respect to the guide element 20, the railing holders 16 can for example be fastened to the guide element in that they are firmly connected to individual reinforcing segments 22 at connection points 26. This firm connection of the railing holders 16 to the reinforcing segments 22 is represented schematically in FIG. 2. In addition, the firm connection of the railing holders 16 to individual reinforcing segments 22 determines the shaping of the railing. For this purpose, the railing holders 16 are firmly mounted at the ends opposite the connection points 26, for example on the transporting device 10.

Alternatively or additionally, reinforcing segments 22 can be designed firmly connectable to the guide element 20. In this case, individual or all reinforcing segments 22 can be firmly connected to the guide element 20, whereby the reinforcing segments 22 are prevented from slipping with respect to the guide element 20. Preferably, it is possible both for railing holders 16 to be firmly connected to individual reinforcing segments 22 at connection points 26 and for reinforcing segments 22 to be firmly connected to the guide element 20.

The invention claimed is:

1. An apparatus for transporting objects comprising:
a transporting device which is configured to transport objects, and
a railing which is configured to guide the objects transported on the transporting device, the railing comprises:
an elastic guide element which is adjustable to a predetermined position to define a path to guide the objects and extends over the entire length of the transporting device,
a plurality of railing holders to which the elastic guide element is fastened and which maintain the elastic guide element in the predetermined position, and
a plurality of reinforcing segments spaced apart from each other, which are not fastened to the railing holders and are arranged at least in the areas between the railing holders and are adjacent to and reinforce the elastic guide element.

2. The apparatus according to claim 1, wherein the elastic guide element has a C-profile in cross section, and wherein the reinforcing segments are configured to be arranged in the C-profile of the elastic guide element.

3. The apparatus according to claim 1, wherein the reinforcing segments in each case have a C-profile in cross section, and wherein the reinforcing segments are configured to engage in grooves of the elastic guide element.

4. The apparatus according to claim 1, wherein the reinforcing segments are made of metal.

5. The apparatus according to claim 1, wherein the elastic guide element consists of plastic.

6. The apparatus according to claim 1, wherein the apparatus further has at least one railing holder, to which the elastic guide element is fastened.

7. The apparatus according to claim 6, wherein the railing holder is configured to define the spatial course of the railing.

8. The apparatus according to claim 1, wherein the reinforcing segments have a length of from 10 to 500 mm.

9. The apparatus according to claim 1, wherein reinforcing segments are configured to connect to the guide element.

10. A method for producing an apparatus for transporting objects, the method comprising the following steps:
provanding a transporting device which is designed to transport objects, and
providing a railing which is designed to guide the objects transported on the transporting device,
providing an elastic guide element which is adjustable to a predetermined position to define a path to guide the objects and extends over the entire length of the transporting device,
providing a plurality of railing holders to which the elastic guide element is fastened and which maintain the elastic guide element in the predetermined position, and
providing a plurality of reinforcing segments not connected to each other, which are not fastened to the railing holders and are arranged adjacent to the guide element and are configured to reinforce the elastic guide element and wherein the elastic guide element is reinforced at least in the areas between the railing holders by means of the plurality of reinforcing segments.

11. The method according to claim 10, wherein the precise course of the railing is not established until the transporting apparatus is being assembled.

12. The method according to claim 10, wherein the reinforcing segments are configured to connect to each other, and wherein the reinforcing segments, after the elastic guide element has been reinforced with them, are rigidly connected to each other.

* * * * *